US010656962B2

(12) United States Patent
Lin et al.

(10) Patent No.: US 10,656,962 B2
(45) Date of Patent: May 19, 2020

(54) ACCELERATE DEEP NEURAL NETWORK IN AN FPGA

(71) Applicant: International Business Machines Corporation, Armonk, NY (US)

(72) Inventors: Yonghua Lin, Beijing (CN); Jianbin Tang, Doncaster East (AU); Junsong Wang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 703 days.

(21) Appl. No.: 15/299,626

(22) Filed: Oct. 21, 2016

(65) Prior Publication Data

US 2018/0114117 A1    Apr. 26, 2018

(51) Int. Cl.
*G06F 9/46* (2006.01)
*G06N 3/063* (2006.01)
*G06N 3/10* (2006.01)

(52) U.S. Cl.
CPC ............... *G06F 9/46* (2013.01); *G06N 3/063* (2013.01); *G06N 3/105* (2013.01)

(58) Field of Classification Search
CPC .......... G06F 9/46; G06N 3/063; G06N 3/105; G06N 3/04; G06N 3/08; G06N 3/10; Y04S 10/54; H04B 10/116; H04B 10/6972
See application file for complete search history.

(56) References Cited

U.S. PATENT DOCUMENTS

| 8,131,659 | B2 | 3/2012 | Xu et al. |
| 9,153,230 | B2 | 10/2015 | Maaninen |
| 9,275,347 | B1 | 3/2016 | Harada et al. |
| 2012/0166374 | A1* | 6/2012 | Moussa ................. G06N 3/063 706/16 |
| 2015/0294219 | A1 | 10/2015 | Krizhevsky |
| 2016/0379109 | A1* | 12/2016 | Chung ..................... G06N 3/04 706/26 |
| 2017/0154262 | A1* | 6/2017 | Sussillo ................. G06N 3/082 |
| 2017/0323045 | A1* | 11/2017 | Huang ................ G06F 17/5054 |

OTHER PUBLICATIONS

David Gschwend, ZynqNet:An FPGA-Accelerated Embedded Convolutional Neural Network, Aug. 2016 (Year: 2016).*

(Continued)

*Primary Examiner* — Robert A Cassity
*Assistant Examiner* — Selene A. Haedi
(74) *Attorney, Agent, or Firm* — Scully, Scott, Murphy & Presser, P.C.; Joseph Petrokaitis, Esq.

(57) ABSTRACT

A method, system and computer program product for accelerating a deep neural network (DNN) in a field-programmable gate array (FPGA) are disclosed. The method includes receiving a DNN net file and weights, converting the received DNN net file to one or more source files, generating an executable FPGA bit file using the one or more source files, and downloading the executable FPGA bit file from the DNN conversion platform to the FPGA. Converting of the received DNN net file and the weights to the one or more source files can further include analyzing the DNN net file to identify a plurality of neural layers, decomposing one or more neural layers of the plurality of neural layers to one or more operation blocks, instantiating the one or more source files, based on the one or more operation blocks.

29 Claims, 10 Drawing Sheets

(56) References Cited

OTHER PUBLICATIONS

Yufei Ma et. al., Scalable and Modularized RTL Compilation of Convolutional Neural Networks onto FPGA, Aug.-Sep. 2016. Conference paper. (Year: 2016).*
Yufei Ma et. al., Scalable and Modularized RTL Compilation of Convolutional Neural Networks onto FPGA, Aug.-Sep. 2016. Conference presentation. (Year: 2016).*
Microsoft FDNN project announcement (Year: 2015).*
Ovtcharov et. al, Accelerating Deep Convolutional Neural Networks Using Specialized Hardware, Feb. 22, 2015. Microsoft White Paper. (Year: 2015).*
Motamedi et. al., "Design Space Exploration of FPGA-Based Deep Convolutional Neural Networks", Jan. 2016 (Year: 2016).*
Dossis, M.F., et al., "Synthesizing Neural Nets into Image Processing Hardware", Journal of Pattern Recognition and Intelligent Systems, May 2013, pp. 10-17, vol. 1, Issue 1.
Zhang, C., et al., "Optimizing FPGA-based Accelerator Design for Deep Convolutional Neural Networks", FPGA '15 Proceedings of the 2015 ACM/SIGDA International Symposium on Field-Programmable Gate Arrays, Feb. 22-24, 2015, 10 pages.
Li, S., et al., "FPGA Acceleration of Recurrent Neural Network based Language Model", 2015 IEEE 23rd Annual Symposium on Field Programmable Custom Computing Machines (FCCM), May 2015, 8 pages.
Suda, N., et al., "Throughput-Optimized OpenCL-based FPGA Accelerator for Large-Scale Convolutional Neural Networks", Arizona State University, ARM Research, Feb. 22, 2016, 28 pages.
Lacey, G., et al., "Deep Learning on FPGAs: Past, Present, and Future", http://arxiv.org/abs/1602.04283, Submitted on Feb. 13, 2016, Accessed on Sep. 27, 2016, 8 pages.
Qiu, J., et al., "Going Deeper with Embedded FPGA Platform for Convolutional Neural Network", FPGA '16, Feb. 21-23, 2016, 10 pages.
Ovtcharov, K., et al., "Accelerating Deep Convolutional Neural Networks Using Specialized Hardware", https://www.microsoft.com/en-us/research/wp-content/uploads/2016/02/CNN20Whitepaper.pdf, Feb. 22, 2015, Accessed on Sep. 27, 2016, pp. 1-4.
Chen, Y., et al., "Eyeriss: An Energy-Efficient Reconfigurable Accelerator for Deep Convolutional Neural Networks", IEEE ISSCC 2016, http://www.mit.edu/~sze/eyeriss.html, Accessed on Sep. 27, 2016, 7 pages.
Wang, J.S., et al., "Using AccDNN to FPGA-accelerate Neural Newtworks without Programming", OpenPOWER Developer Challenge, https://www.youtube.com/watch?v=zsy7fyNu8uc, Streamed live on Jul. 7, 2016, Accessed on Sep. 27, 2016, 8 pages, (Grace Period Disclosure).
Lin ,Y.H., "SuperVessel: Cognitive Computing Platform on the OpenStack based OpenPOWER Cloud", OpenPOWER Summit 2016, Apr. 5-8, 2016, 14 pages, (Grace Period Disclosure).

* cited by examiner

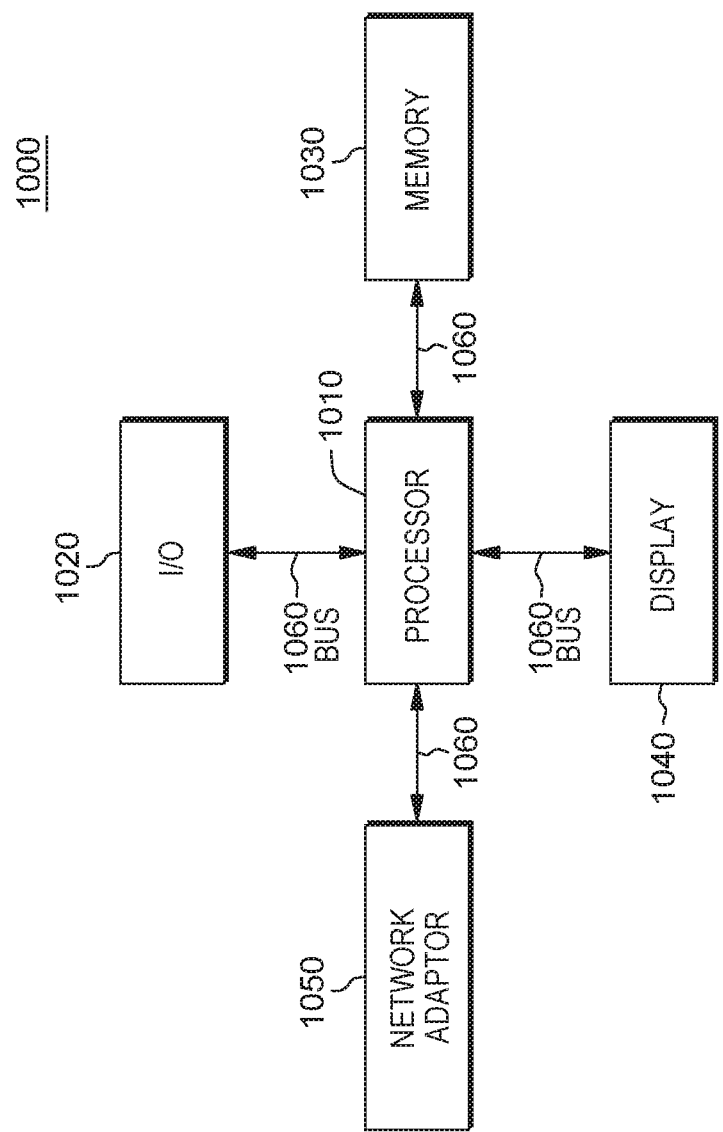

ACCELERATE DEEP NEURAL NETWORK IN AN FPGA

FIELD

The present invention relates generally to a deep neural network (DNN), and more particularly to accelerating a DNN in a field-programmable gate array (FPGA).

STATEMENT REGARDING PRIOR DISCLOSURES BY THE INVENTOR OR A JOINT INVENTOR

It should be appreciated that non-patent literatures entitled: "Using AccDNN to FPGA-accelerate neural networks without programming", OpenPOWER™ developer challenge, July 7 (www.youtube.com) and "SuperVessel: cognitive computing platform on the openstack based openpower cloud", OpenPower™ Summit 2016, Apr. 5-8 were disclosed by the inventor or a joint inventor. Also, these disclosures were made one year or less before the effective filing data of the claimed invention.

BACKGROUND

Deep learning has led to state-of-the-art improvements in the accuracy of many artificial intelligence tasks, such as large-category image classification and recognition, speech recognition and nature language processing. The architecture can involve complex and many-layered neural networks (e.g., deep neural networks (DNN)) that can require intense computation for training and/or evaluation.

One approach uses a field programmable gate array (FPGA), which suffers from requiring developers to work with a hardware-centric register transfer level (RTL) flow. Although some FPGA manufacturers have provided high level synthesis tools that facilitate developers' programming of FPGAs using software-centric programming languages, such as C/C++, Matlab®, and OpenCL®, considerable programming effort remains and the performance of the provided synthesis tools is typically considered not as good as the hardware-centric RTL implementation.

Thus, a need exists for improvements in converting of a DNN model to an FPGA RTL-level implementation.

BRIEF SUMMARY

In an aspect of the present invention, a computer-implemented method for accelerating a deep neural network (DNN) in a field-programmable gate array (FPGA) is provided. The method comprises receiving a DNN net file of the DNN, converting the DNN net file to one or more source files by: analyzing the DNN net file to identify a plurality of neural layers; decomposing one or more neural layers of the plurality of neural layers to one or more operation blocks; and instantiating the one or more source files, based on the one or more operation blocks, generating an executable FPGA bit file using the one or more source files, and downloading the executable FPGA bit file to the FPGA.

In an aspect of the present invention, a computer-implemented method for accelerating a DNN in an FPGA is provided. The method comprises receiving a DNN net file of the DNN, analyzing the DNN net file to obtain a network structure including a plurality of neural layers, generating one or more hardware description language source files, each of which corresponds to one of the neural layers, generating an executable FPGA bit file using the hardware description language source files, and downloading the executable FPGA bit file to the FPGA.

In an aspect of the present invention, a system for accelerating a DNN in an FPGA is provided. The system comprises at least one processor and memory communicatively coupled to the at least one processor. The memory stores processor readable program instructions that, when executed by the at least one processor, cause the at least one processor to receive a DNN net file, convert the DNN net file to one or more source files by: analyzing the DNN net file to identify a plurality of neural layers; decomposing one or more neural layers of the plurality of neural layers to one or more operation blocks; and instantiating the one or more source files, based on the one or more operation blocks, generate an executable FPGA bit file using the one or more source files, and download the executable FPGA bit file to the FPGA.

In an aspect of the present invention, a computer program product stored in a computer-readable storage medium having computer readable program instructions is provided. The computer readable program instructions are read and executed by at least one processor for performing a computer-implemented method of accelerating a deep neural network (DNN) in a field-programmable gate array (FPGA). The method comprises receiving a DNN net file, converting the DNN net file to one or more source files by: analyzing the DNN net file to identify a plurality of neural layers; decomposing one or more neural layers of the plurality of neural layers to one or more operation blocks; and instantiating the one or more source files, based on the one or more operation blocks, generating an executable FPGA bit file using the one or more source files, and downloading the executable FPGA bit file to the FPGA.

In an aspect of the present invention, a computer program product stored in a computer-readable storage medium having computer readable program instructions is provided. The computer readable program instructions are read and executed by at least one processor for performing a computer-implemented method of accelerating a deep neural network (DNN) in a field-programmable gate array (FPGA). The method comprises receiving a DNN net file of the DNN, analyzing the DNN net file to obtain a network structure including a plurality of neural layers, generating one or more hardware description language source files, each of which corresponds to one of the neural layers, generating an executable FPGA bit file using the hardware description language source files, and downloading the executable FPGA bit file to the FPGA.

In an aspect of the present invention, a system for accelerating a DNN in an FPGA is provided. The system comprises at least one processor and memory communicatively coupled to the at least one processor. The memory stores processor readable program instructions that, when executed by the at least one processor, cause the at least one processor to receive a DNN net file of the DNN, analyze the DNN net file to obtain a network structure including a plurality of neural layers, generate one or more hardware description language source files, each of which corresponds to one of the neural layers, generate an executable FPGA bit file using the hardware description language source files, and download the executable FPGA bit file to the FPGA.

BRIEF DESCRIPTION OF THE SEVERAL VIEWS OF THE DRAWINGS

FIG. 7 illustrates a block diagram of a computing system according to an exemplary embodiment of the present invention.

DETAILED DESCRIPTION

Embodiments of the present invention will now be described in detail with reference to the drawings. However, the following embodiments do not restrict the invention claimed in the claims. Moreover, all features and combinations of features described in various embodiments are not mandatory within the scope and spirit of the present invention. Like numbers are assigned to like components throughout the description of the embodiments of the present invention.

Figure 1:
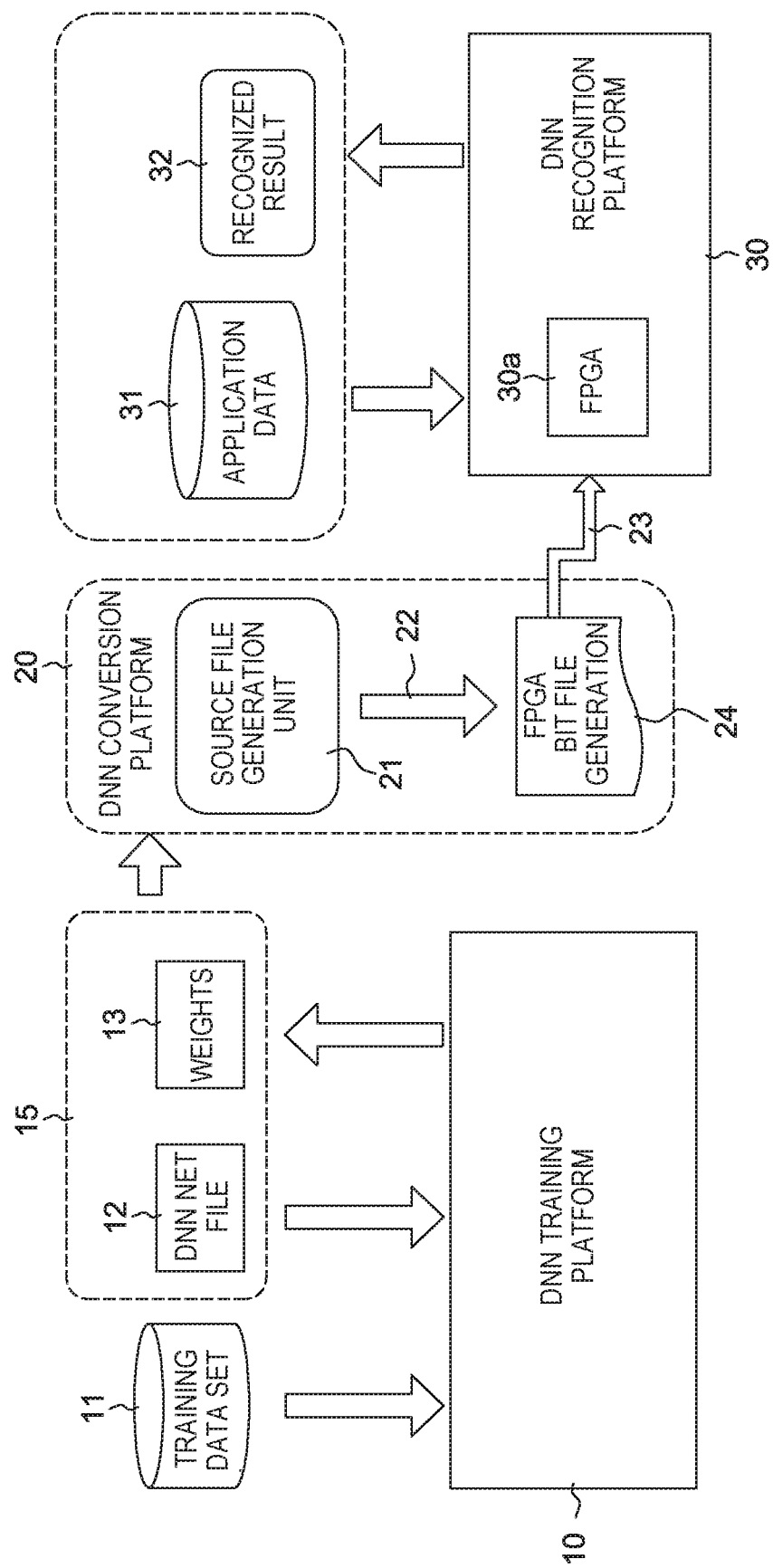
FIG. 1 illustrates an environment for accelerating a deep neural network (DNN) in an FPGA according to an embodiment of the present invention.

FIG. 1 illustrates an environment for accelerating a deep neural network (DNN) in an FPGA according to an embodiment of the present invention. As depicted, the environment includes a DNN training platform 10, a DNN conversion platform 20, and a DNN recognition platform 30 including an FPGA 30a.

In some embodiments, the DNN training platform 10 may be implemented through a graphic processor unit (GPU)-based accelerator (not shown). In some embodiments, the DNN training platform 10 and the DNN conversion platform 20 may be implemented with one or more processors and memory (not shown).

The DNN training platform 10 may train a DNN model using a training data set 11 that may be stored in an external storage (not shown) and receive a DNN net file 12 from an external source (not shown). The DNN training platform 10 may also include one or more DNN frameworks/platforms (not shown). By way of example only, "open-source" implementation of DNN frameworks are available e.g., "Caffe" (github.com), "Theano" (www.deeplearning.net), "Torch" (www.deeplearning.net), "TensorFlow" (www.tensorflow.org), "Neuroph" (www.neuroph.sourceforge.net), and "Deeplearning4j" (www.deeplearning4j.org).

In some embodiments, the DNN training platform 10 may receive the train data set 11 and the DNN net file 12, train a DNN model defined in the DNN net file 12 using the train data set 11, and generate a trained DNN model 15 with weights 13. The trained DNN model 15 may be characterized by the DNN net file 12 and the weights 13 included therein and may correspond to a DNN to be accelerated in the FPGA 30a which will be explained later. In some embodiments, the DNN net file 12 may be designed to reflect real problems and applications. The weights 13 may be synaptic weights that can be understood as parameters to a neuron synapsis of the DNN and can represent a strength or amplitude of a connection between two nodes in the DNN. The DNN net file 12 and the weights 13 can be input to the DNN conversion platform 20.

In some embodiments, the DNN conversion platform 20 may comprise a source file generation unit 21 and an FPGA bit file generation unit 24. The source file generation unit 21 may translate (or convert) the DNN net file 12 and the weights 13 to one or more source files 22. In some embodiments, the one or more source files 22 may be generated using hardware description languages (HDL) such as Verilog® (standardized as IEEE® 1364), very high speed integrated circuit HDL (VHDL), and the like. The FPGA bit file generation unit 24 may further translate (or convert) the one or more source files 22 to an executable FPGA bit file 23, which may be provided to the FPGA 30a.

In some embodiments, the DNN recognition platform 30 may receive input application data 31 from an external source (not shown), perform a recognition process on the application data 31 using the FPGA 30a to which the executable FPGA bit file 23 is downloaded, and output one or more recognized result(s) 32.

Figure 2A:
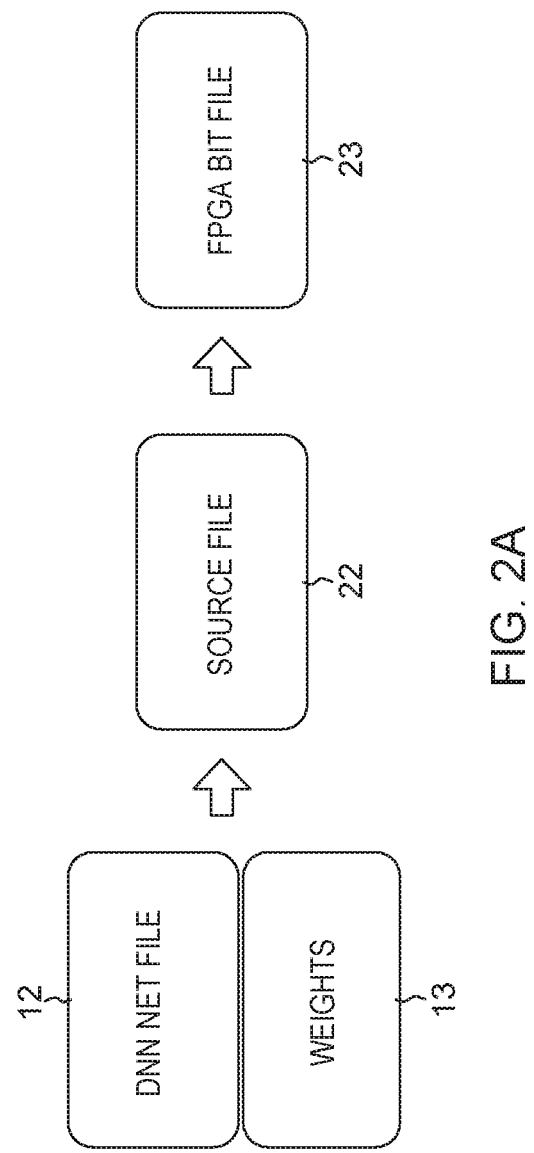
FIG. 2A illustrates a framework of the DNN conversion platform according to an embodiment of the present invention.

FIG. 2A illustrates an exemplary framework of the DNN conversion platform 20 (depicted in FIG. 1), according to an embodiment of the present invention. In some embodiments, the term "automatically" means "no significant programming effort by user is necessary." Referring now to the example in FIG. 2A, the DNN net file 12 and the weights 13 are input to and automatically translated (or converted) to the one or more source files 22 through the source file generation unit 21, such as is shown in FIG. 1. The one or more source files 22 are also automatically converted to the executable FPGA bit file 23 through the FPGA bit file generation unit 24. For example, the generated executable FPGA bit file 23 may be provided to the FPGA 30a (FIG. 1).

By way of introduction to the example depicted in FIG. 2B, a net definition file (discussed hereinabove) is further illustrated in the form of exemplary code for a DNN net definition file and correspondingly generated source file(s) (discussed hereinabove) embodied as exemplary Verilog® files, according to an embodiment of the present invention.

Figure 2B:
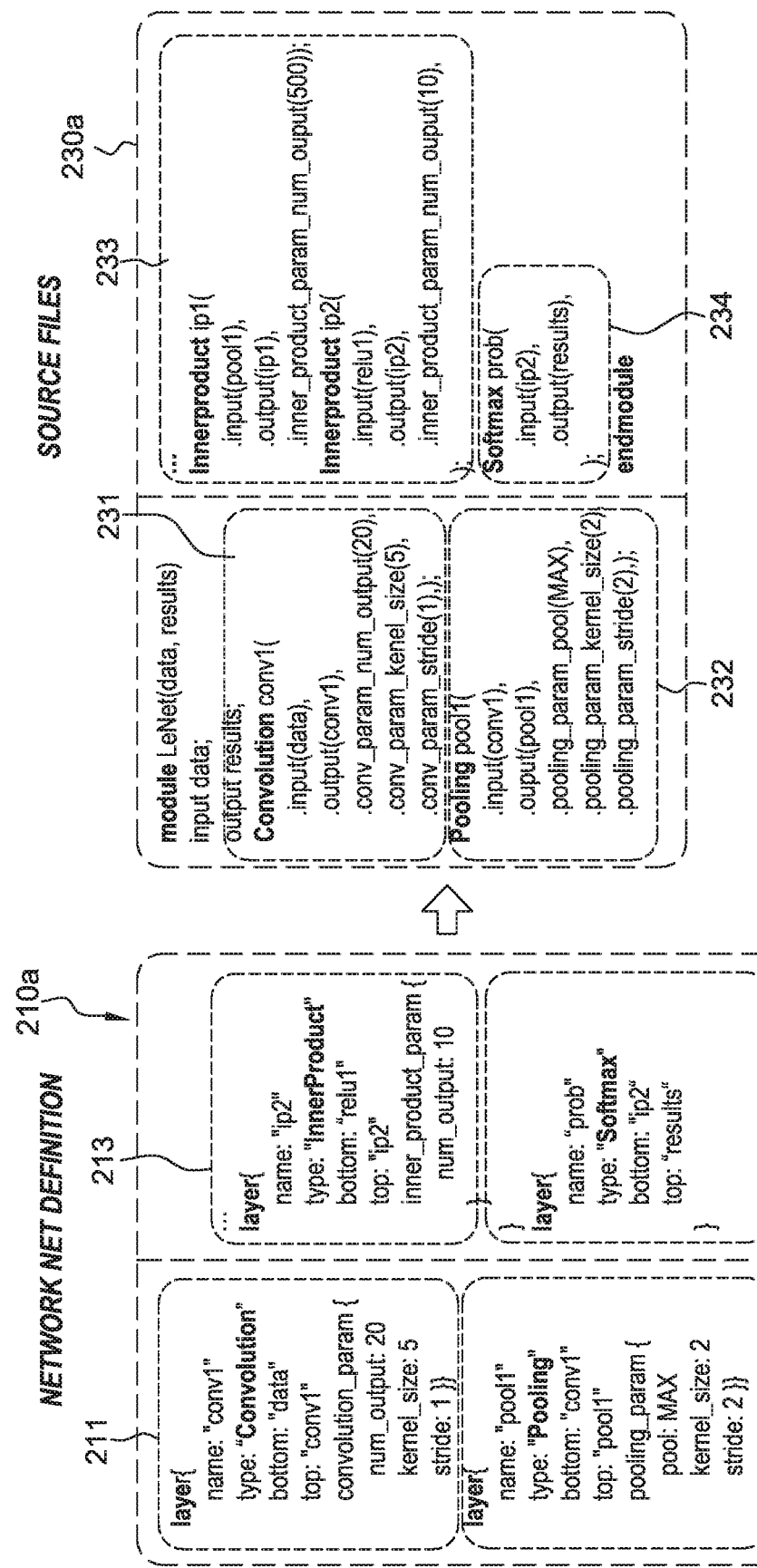
FIG. 2B illustrates exemplary codes of the respective DNN net file and the synaptic weights according to an embodiment of the present invention.

Referring now to the example depicted in FIG. 2B, an exemplary DNN net definition file 210a (shown in the left side of FIG. 2B) comprises neural layers 211 to 214, i.e., a convolution layer 211, a pooling layer 212, an inner product layer 213, and a softmax layer 214 of a trained DNN model. In addition, Verilog® source files 230a (shown in the right side of FIG. 2B) comprising source code files 231 to 234 (corresponding to respective neural layers 211 to 214) of the net definition file 210a are generated.

According to some embodiments of the present invention (as will be discussed in more detail with reference to FIG. 3), the DNN recognition platform 30 may be implemented based on a convolutional neural network (CNN). The CNN may include multiple layers such as a convolution layer, a pooling layer, a ReLU layer, a fully connected layer, a loss layer, and so on. The layers of the CNN may have neurons arranged in one or more dimensions. For example, an arrangement in three dimensions (3D) might be width, height, and depth, and major computations may occur in convolutions at the 3D layers (i.e., 3D convolution computation). In some embodiments, 3D convolution computation(s) may be parallelized in each dimension (e.g., width, height, and depth), as well as kernel, and channel. In some embodiments however, resource constraints of the FPGA 30a (FIG. 1) may limit parallelisms to the kernel and channel.

Figure 3:
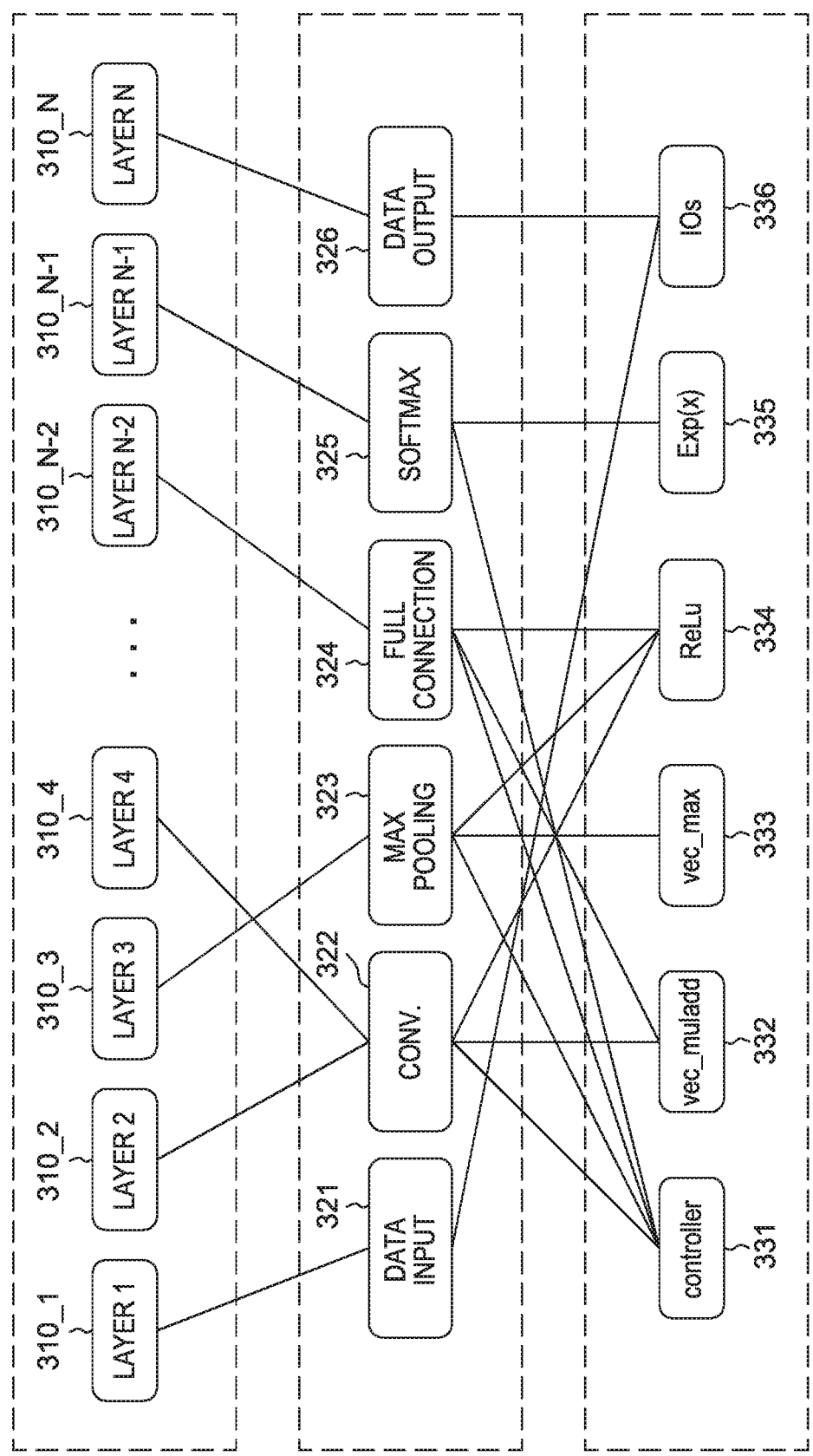
FIG. 3 illustrates a workflow of automatically converting a DNN net file to one or more source files, according to an embodiment of the present invention.

FIG. 3 is a block diagram used to illustrate an exemplary workflow for automatically converting a net file to one or more source files according to an embodiment of the present invention. By way of introduction to FIG. 3, the DNN net file 12 (FIG. 1) input to the DNN conversion platform 20 (FIG. 1). Such net file, referring now to FIG. 3, may include information of a plurality of layers 310_1 to 310_N, each of which corresponds to at least one of neural layers 321 to 326. Here, N is an integer greater than one.

By way of further example, the neural layers 321 to 326 may be embodied as a data input layer 321, a convolution layer 322, a max pooling layer 323, a full connection layer 324, a softmax layer 325, and a data output layer 326, respectively. In addition, a workload (e.g., amount of data) or a scale of the neural layers 321 to 326 may be determined (or estimated) to determine a parallelism level with respect to the kernel or channel, such as in cases where FPGA resources are constrained. For example, the parallelism level may be associated with a kernel parallelism factor (KPF) and a channel parallelism factor (CPF) of each neural layer 321 to 326. Here, the KPF represents how many kernels can be computed simultaneously in each neural layer, and the CPF represents how many channels can be computed simultaneously in each neural layer. The higher the parallelism level (e.g., KPF and CPF), the faster DNN recognition platform 30 (FIG. 1) is; however, more FPGA resources (e.g., memory, double date rate (DDR) bandwidth, etc.) are required. Since FPGA resources are typically limited and differ, depending on the type of FPGA, an optimal KPF and CPF may be determined by determining the workload or scale of each neural layer within the constraints of the available FPGA resources. Thus, full use can be made of limited FPGA resources while adapting to varying amounts of the FPGA resources for various FPGA types.

Referring again to FIG. 3, network operations (or functions) of each neural layer 321 to 326 may be decomposed to one or more basic linear algebra operations such as a vector multiplication and adder 332, a vector max 333, a rectified linear unit (ReLu) 334, a Exp(x) 335, etc., as well as operations of a controller 331 and input/output (I/O) 336, etc. The vector max 333 may select a maximal element in vector data. The ReLu 334 may output a value equal to an input data value if the input data value is greater than 0, otherwise it may output "0". The Exp(x) 335 may provide an exponential function output to an input data value. The operations corresponding to the vector multiplication and adder 332, the vector max 333, the rectified linear unit (ReLu) 334, the Exp(x) 335, the controller 331, the input/output (I/O) 336, etc. may be constructed, for example, using one or more source codes (e.g., Verilog® source code) that are instantiated (or implemented) as corresponding to the one or more neural layers 321 to 326.

In one embodiment, the data input layer 321 and the data output layer 326 may be decomposed to an operation of the I/O 336. One or more source codes corresponding to the I/O 336 may be instantiated (or implemented), and combined to generate one or more top level source files corresponding to the data input layer 321 and the data output layer 326. Further, the convolution layer 322 may be decomposed through basic linear algebra operations, to the controller 331, the vector multiplication and adder 332, and the ReLu 334. In addition, one or more source codes corresponding to the controller 331, the vector multiplication and adder 332, and the ReLu 334 may be instantiated (or implemented), and combined to generate a top level source file corresponding to the convolution layer 322.

Further still, the max pooling layer 323 may be decomposed through basic linear algebra operations, to the controller 331, the vector max 333, and the ReLu 334. One or more source codes corresponding to the controller 331, the vector max 333, and the ReLu 334 may be instantiated (or implemented) to generate one or more instance(s) and combined to generate a top level source file corresponding to the max pooling layer 323. Further still, the full connection layer 324 may be decomposed through basic linear algebra operations, to the controller 331, the vector multiplication and adder 332, and the ReLu 334. One or more source codes corresponding to the controller 331, the vector multiplication and adder 332, and the ReLu 334 may be instantiated (or implemented), and combined to generate a top level source file corresponding to the full connection layer 324. Further, the softmax layer 325 may be decomposed through basic linear algebra operations, to the controller 331 and the Exp(x) 335. One or more source codes corresponding to the controller 331 and the Exp(x) 335 may be instantiated (or implemented), and combined to generate a top level source file corresponding to the softmax layer 325. For example, the softmax 325 may comprise an operation for generalizing a logistic function that squashes one or more dimensional vectors of arbitrary real values to one or more dimensional vectors of real values in the range (0, 1) that add up to 1, and the ReLu 334 may comprise an operation for performing a threshold operation where any input value less than a specific value a (e.g., zero) is set to zero (e.g., $f(x)=x$ when $x \geq a$ (e.g., $a=0$), otherwise $f(x)=0$, x, here x is an input to a neuron).

Figure 4:
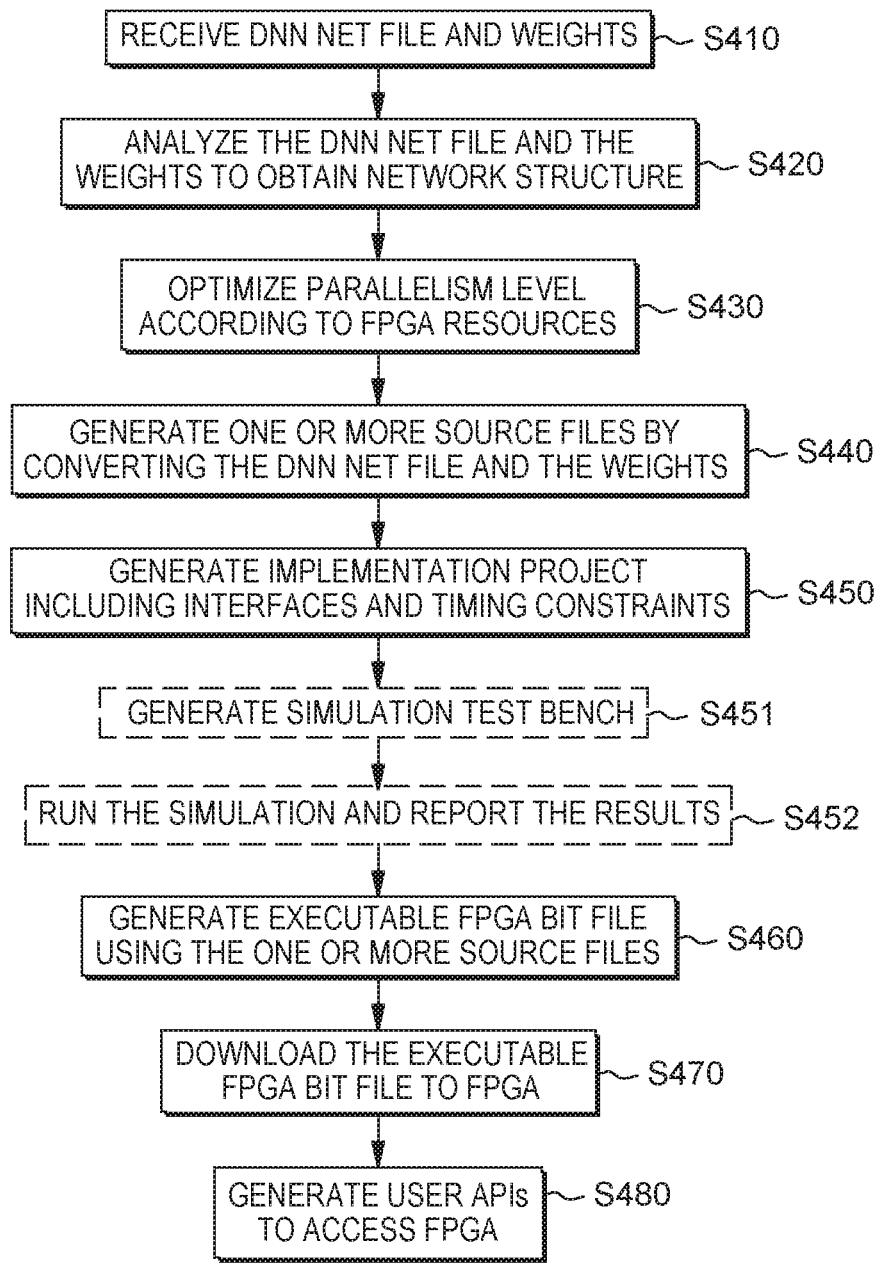
FIG. 4 illustrates a method for accelerating a trained DNN model in an FPGA according to an embodiment of the present invention.

FIG. 4 is a flow chart illustrating a method 400 for accelerating a trained DNN model (including a DNN net file and weights) in an FPGA, according to an embodiment of the present invention.

The method commences in step S410 when a trained DNN net file 12 and weights 13 are received.

As depicted, in step S420, the DNN net file 12 and the weights 13 are analyzed to obtain a network structure.

In step S430, a parallelism level with respect to kernel or channel is optimized based on FPGA resources. In another example, a parallelism level is optimized by determining the KPF or CPF, based on FPGA resources. In another example, optimizing the parallelism level may include determining the KPF and/or CPF of each neural layer.

In step S440, the DNN net file 12 and the weights 13 are automatically converted to the one or more source files 22.

In step S450, interface and timing constraints are implemented based on an FPGA design. The interface constraints are used to assign a signal to a specific I/O interface (or pin) and the timing constraints are used to specify the timing characteristics of an FPGA design.

In step S460, an executable FPGA bit file 23 is generated using the one or more source files 22.

In step S470, the executable FPGA bit file 23 is downloaded to the FPGA 30a.

In step S480, user application program interfaces (APIs) to access the FPGA 30a are generated.

In step S451, a simulation test bench may be generated, and in step S452, the simulation run and results (e.g., accuracy) may be generated.

Figure 5A:
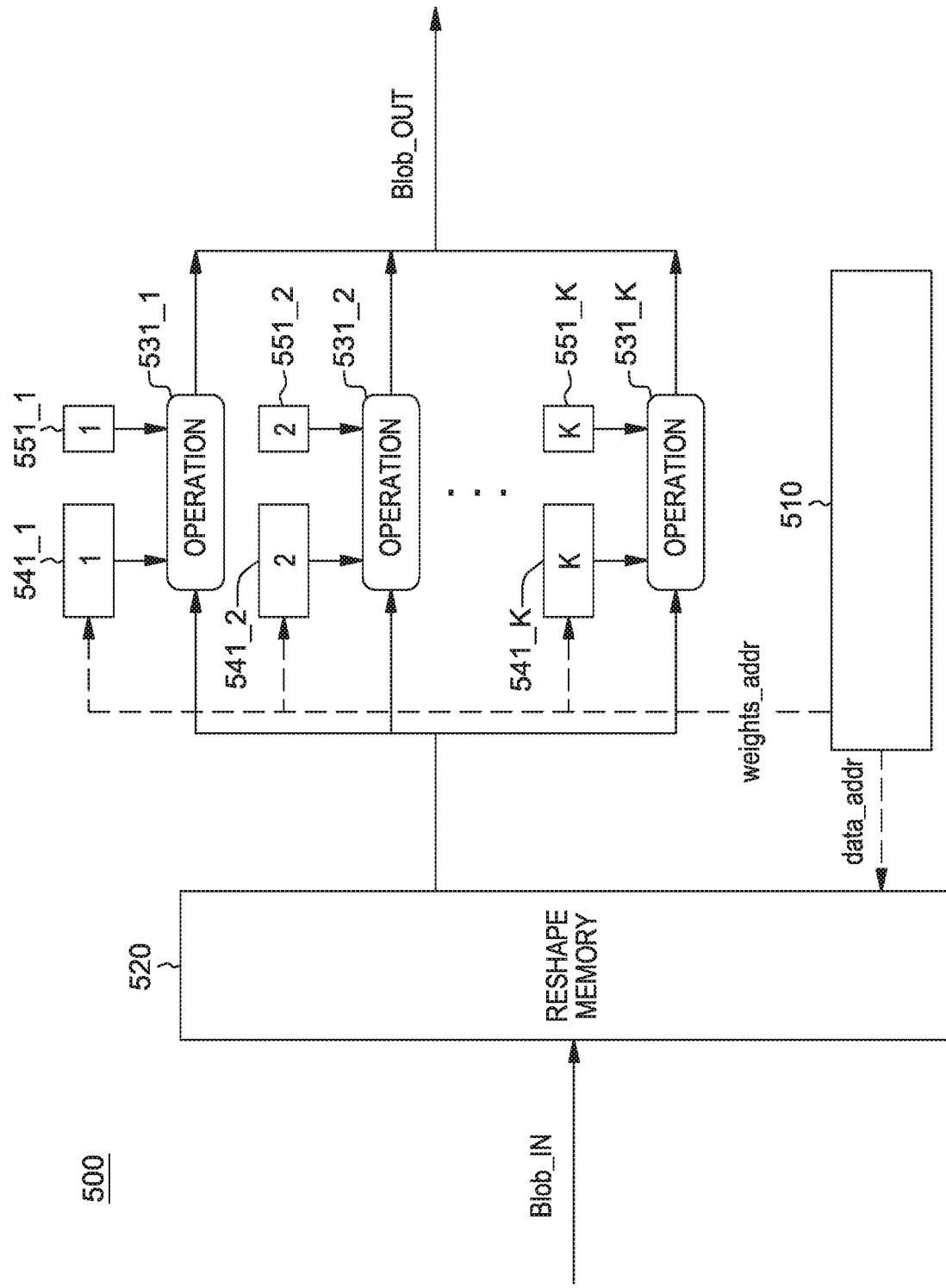
FIG. 5A illustrates a basic operation model according to an embodiment of the present invention.
Figure 5B:
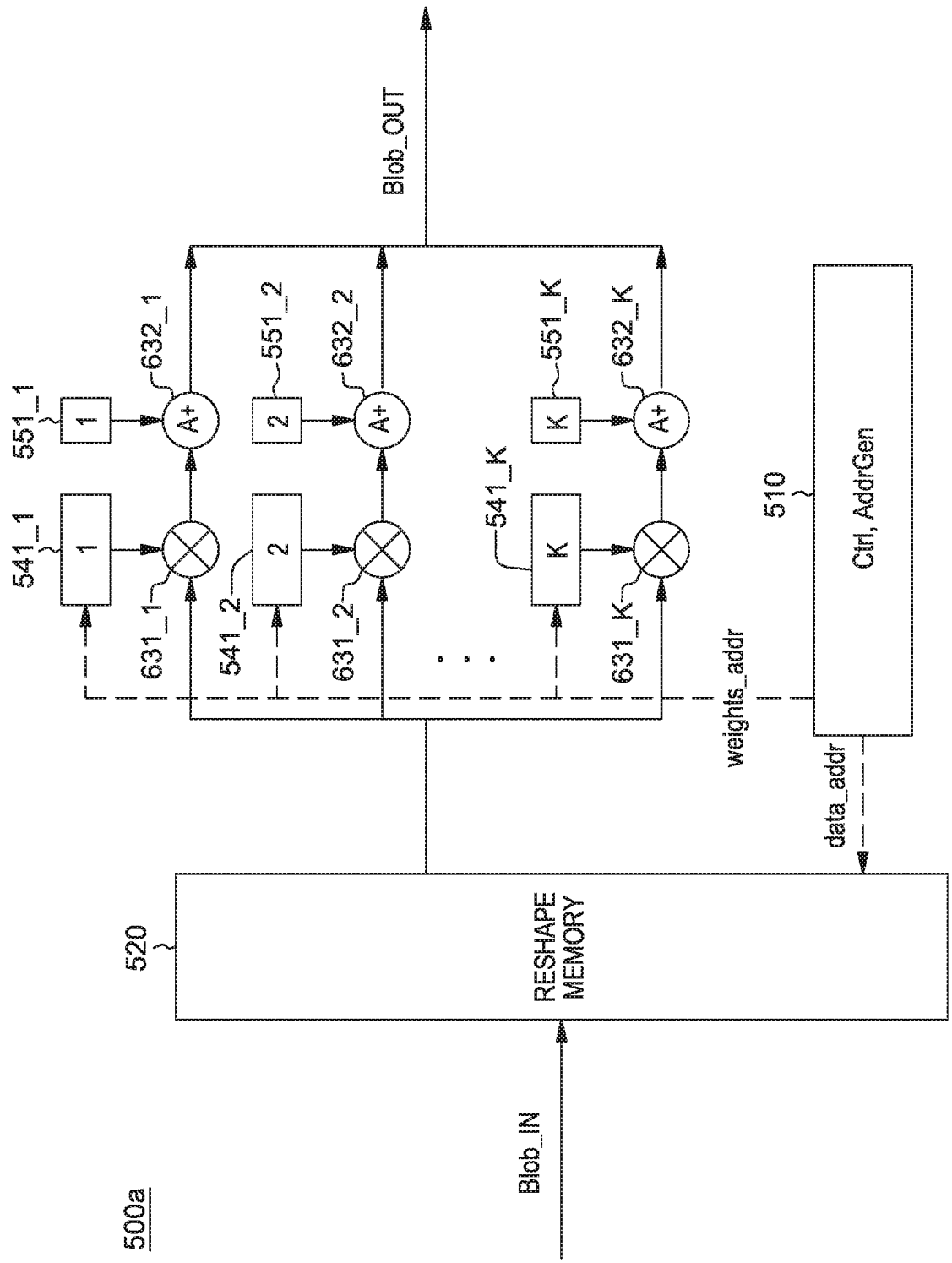
FIG. 5B illustrates an example of operation model in a convolution layer according to an embodiment of the present invention.
Figure 5C:
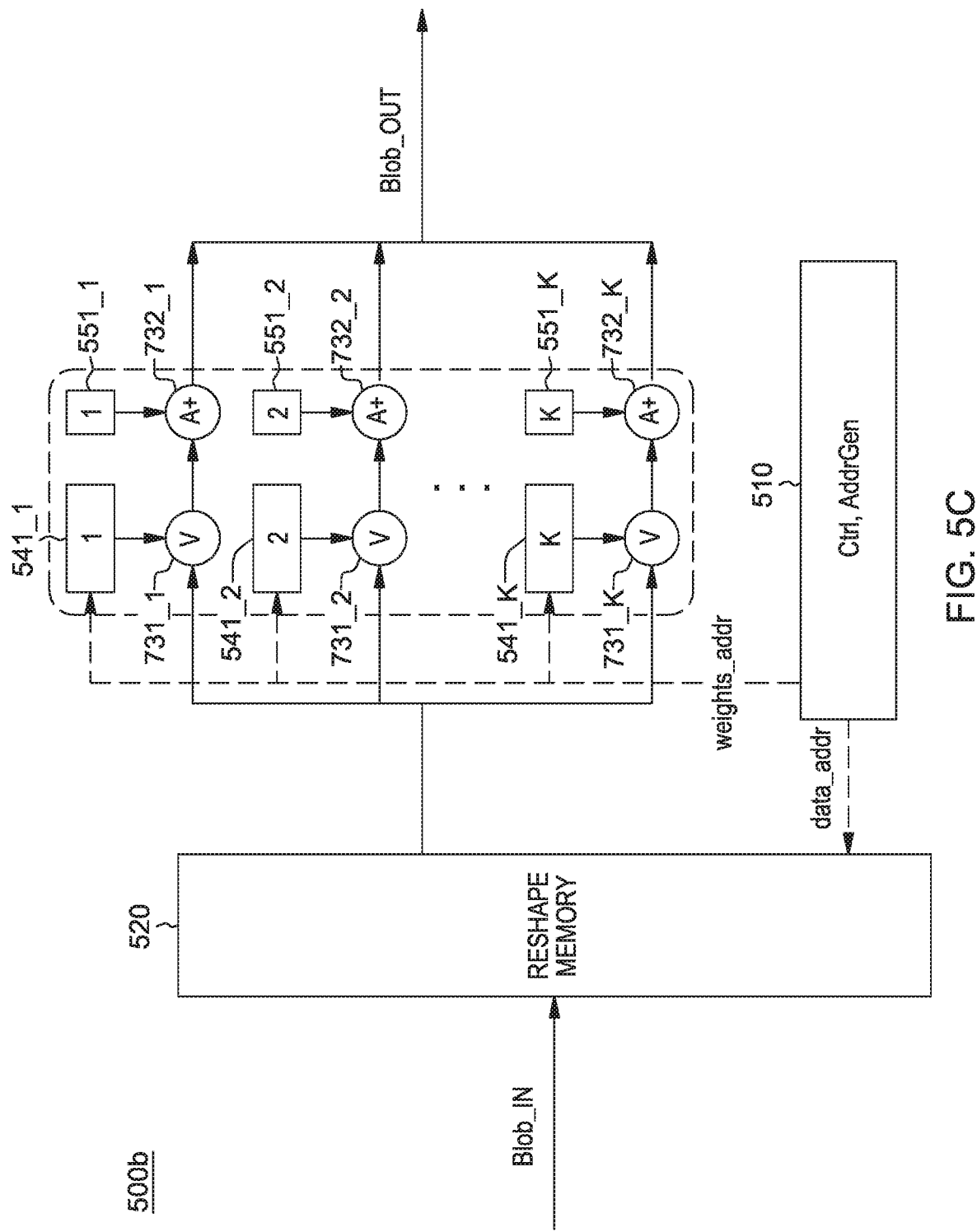
FIG. 5C illustrates an example of operation model in a convolution layer according to an exemplary embodiment of the present invention.

By way of introduction to FIGS. 5A to 5C, embodiments of the DNN recognition platform 30, in which the executable FPGA bit file 23 is downloaded and implemented, a uniform data model and a uniform operation model is applied to each of the neural layers 321 to 326 (FIG. 3), thus allowing the data to stream layer-by-layer and various types of neural networks to be mapped to the same computing framework. Exemplary embodiments thereof will be described in more detail with reference to FIGS. 5A to 5C. For example, one or more source files 22 may be instantiated (or implemented) using the uniform data model and uniform operation model for each neural layer. This feature can facilitate automatically converting the DNN net file 12 and/or the weights 13 to the source file(s) 22 (FIG. 1). In addition, in one embodiment, the DNN recognition platform 30 may also use a uniform operation model which can be applied to various neural layers 321 to 326 (FIG. 3).

In some embodiments, the DNN recognition platform 30 may use an elastic operation model, which can facilitate a tradeoff of complexity among a processor, such as a digital signal processor (DSP), memory, such as a random access memory (RAM), and an operation time therein. The elastic operation model may be understood to mean that the operation is implemented in various scales by changing the CPF and KPF. For example, the more resources the FPGA has, the larger the model that may be implemented to speed up the calculations.

In some embodiments, a data model (e.g., Blob depicted in FIG. 5A), is used in each neural layer of the DNN recognition platform 30, has a structure that models the data as multi-dimensional. For example, Width (W)×Height (H)×Channel(C); weights with a dimension of Kernel (K)×Width (W)×Height (H)×Channel(C); and a bias, which is a vector whose magnitude corresponds to the kernel (K). An example of such a data model structure will be discussed in more detail below. By way of further example for such data in the data model, a 256×256 RGB image data can have dimensions of W (=256)×H (=256)×C (i.e., 3D as R,G,B), a feature map with dimensions of W (=224)×H (=224)×C(=96), and a 1024 node neural layer, with dimensions of W (=1)×H (=1)×C(=1024). By way of further example for weights, a convolution kernel can have dimensions K (=50)×W (=5)×H (=5)×C(=96), a full connection kernel can have dimensions K (=1024)×W (=1)×H (=1)×C(=1024), and a perceptron kernel can have dimensions of K (=1024)×W (=1)×H (=1)×C(=1).

FIG. 5A illustrates a basic operation model according to an embodiment of the present invention.

In some embodiments, each neural layer (e.g., 321 to 326 of FIG. 3) may be implemented based on an operation model 500 depicted in FIG. 5A. The operation model 500 receives data Blob_In, in the form of a structure based on a data model Blob. The data Blob_In may be reshaped to fit within parallel computing requirements of a current layer and stored in reshape memory 520. The reshape memory 520 may receive input data with a dimension of (DW×KPF)×(W×H×KG), which comes from a previous layer, and output data with a dimension of (DW×CPF)×(W×H×CG) to the current layer. Here, "DW" represents "data width", "KG" represents "kernel group" defined by "K/KPF", and "CG" represents "channel group" defined by "C/CPF". In some embodiments, parallelism tradeoffs may only be performed with respect to channel(s) (C) and kernel(s) (K), and might not be parallelized with respect to width W and height H due to the limited resources of an FPGA. The KPF and the CPF in the reshape memory 520 may have values defined in the previous layer and the current layer, respectively. Thus, the data Blob_In input to the reshape memory 520 may be of any style, depending on the KPF of the previous layer, and the output data Blob_OUT may be of any style, depending on the CPF of the current layer. In one embodiment, the reshape memory 520 may be implemented by block or distribution RAM in the FPGA 30a, according to the memory architecture and total resource balance. The reshape memory 520 may also provide data stored therein to a plurality of core operation (e.g., basic linear algebra operation) units 531_1 to 531_K. The basic operation model 500 may further include a control unit 510, which can generate data addresses data_addr as input to the reshape memory 520 and/or weight addresses weights_addr as inputs to each of kernel weight memories 541_1 to 541_K. The basic operation model 500 may also include a plurality of bias memories 551_1 to 551_K. Here, K is the number of kernels which is an integer greater than 1.

As shown in FIG. 5A, each core operation unit 531_1 to 531_K may perform a specific mathematical calculation on one or more of: data provided from the reshape memory 520; kernel weight data provided from a corresponding one of the kernel weight memories 541_1 to 541_K; and bias data provided from a corresponding one of the bias memories 551_1 to 551_K. Thus, the calculated outputs of the core operation units 531_1 to 531_K may be provided as output data Blob_OUT.

In one embodiment, each kernel weight memory 541_1 to 541_K (e.g., separated memory) may have a dimension of, e.g., (DW×CPF)×(W×H×CG). Further, in one embodiment, when the kernel weight memories 541_1 to 541_K are aggregated (e.g., aggregated memory), its dimension may be, e.g., (DW×CPF×KPF)×(W×H×CG×KG). In one embodiment, each bias memory 551_1 to 551_K may have a dimension of, e.g., (DW×KPF)×KG.

In one embodiment, the core operation units 531_1 to 531_K may be implemented with operations such as vector inner product, accumulated multiplication, max, ReLu, or the like.

FIG. 5B illustrates an example of an operation model 500a in a convolution layer (e.g., 322 of FIG. 3) according to an exemplary embodiment of the present invention. In the example depicted in FIG. 5B, it is assumed that CPF is 1 and KPF is K (e.g., parallelism factor is K). In one embodiment, each of the operation units 531_1 to 531_K (FIG. 5A) may be implemented with processing devices including a multiplication unit and an accumulated adder (examples of each are depicted in FIG. 5B). For example, operation unit 531_1 (FIG. 5A) may be implemented with a multiplication unit 631_1 (FIG. 5B) and an accumulated adder 632_1 (FIG. 5B). Similarly, the operation unit 531_2 (FIG. 5A) may be implemented with a multiplication unit 631_2 (FIG. 5B) and an accumulated adder 632_2 (FIG. 5B), and the operation unit 531_K (FIG. 5A) may be implemented with a multiplication unit 631_K (FIG. 5B) and an accumulated adder 632_K (FIG. 5B). Thus, in one embodiment, when input data $DB\_in_{pos\_w+w, pos\_h+h, c}$ is input to each operation unit including the multiplication unit (e.g., 631_1) and the accumulated adder (e.g., 632_1), the output data $DB\_out_{pos\_w, pos\_h}$ may be obtained by the following equation:

$$DB\_out_{pos\_w, pos\_h} = \sum_{w=0}^{WB\_W-1} \cdot \sum_{h=0}^{WB\_H-1} \cdot \sum_{c=0}^{WB\_C-1} DB\_in_{pos\_w+w, pos\_h+h, c} \cdot WB_{w,h,c} \quad (1)$$

Here, WB represents weight data stored in each weight memory 541_1 to 541_K (FIG. 5A), and WB_W, WB_H, and WB_C respectively represent sizes of width, height, and channel of the weights. In the model 500a (FIG. 5B), each accumulated adder may calculate for three dimensions such as width (W), height (H), and channel (C). Further, pos_w and pos_h in the equation (1) represent respective start positions of the convolutional operation with respect to width and height directions.

FIG. 5C illustrates an example of an operation model 500b in a convolution layer according to an exemplary embodiment of the present invention.

In one embodiment of the model 500b, each kernel may finish one convolution within clocks of, e.g., W×H×C with a single multiplier. In this case, a total number of multipliers may be K and a total operation time taken in the model 500b may be given as a function of W×H×C.

In one embodiment, referring to FIG. 5C, it is assumed that CPF is C and KPF is K (e.g., parallelism factor is K*C, where "*" indicates multiplication). In one embodiment, each of the operations units 531_1 to 531_K (FIG. 5A) may be implemented with processing devices including an inner product unit and an accumulated adder. For example, the operation unit 531_1 (FIG. 5A) may be implemented with an inner product unit 731_1 (FIG. 5C) and an accumulated adder 732_1 (FIG. 5C). Similarly, the operation unit 531_2 (FIG. 5A) may be implemented with an inner product unit 731_2 (FIG. 5C) and an accumulated adder 732_2 (FIG. 5C), and the operation unit 531_K (FIG. 5A) may be implemented with an inner product unit 731_K (FIG. 5C) and an accumulated adder 732_K (FIG. 5C). Thus, in one embodiment, when input data $DB\_in_{pos\_w+w,\ pos\_h+h,\ c}$ is input to each operation unit including the inner product unit (e.g., 731_1) and the accumulated adder (e.g., 732_1), the output data $DB\_out_{pos\_w,\ pos\_h}$ may be obtained by the following equation:

$$DB\_out_{pos\_w,pos\_h} = \sum_{w=0}^{WB\_W-1} \cdot \sum_{h=0}^{WB\_H-1} \overrightarrow{DB\_in}_{po\_w+w,pos\_h+h} \cdot \overrightarrow{WB}_{w,h} \quad (2)$$

In the model 500b, each accumulated adder may calculate for two dimensions such as width (W) and height (H).

Thus, in the model 500b, each kernel may finish one convolution operation within clocks of, e.g., W×H with C multipliers. In this case, a total number of multipliers may be K*C and a total operation time taken in this model 500b may be given as a function of W×H which is C times faster than that in the model 500a. In one embodiment, the parallelism factor may be traded off according to resources of an FPGA between 1 to K*C.

Figure 6:
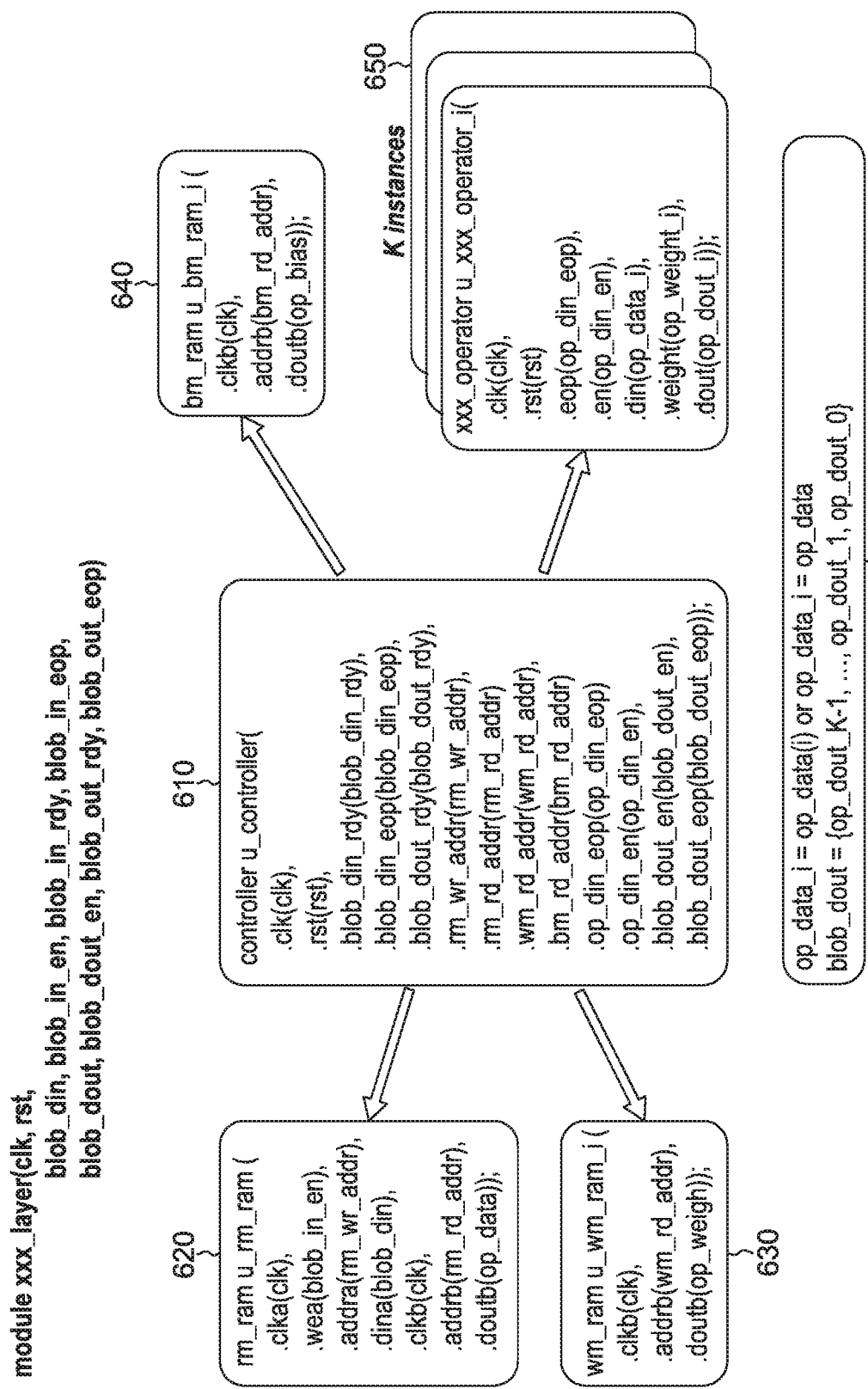
FIG. 6 illustrates an example of source code implemented according to the example operation model of FIG. 5A, according to an embodiment of the present invention.

FIG. 6 illustrates an example of source codes implemented correspondingly to the operation model of FIG. 5A according to an embodiment of the present invention.

Referring now to FIG. 6 and FIG. 5A, a block 610 may correspond to the operations of the control unit 510 (FIG. 5A), a block 620 may correspond to the operation of the reshape memory 520 (FIG. 5A), a block 630 may correspond to the operations of the weight memories 541_1 to 541_K (FIG. 5A), a block 640 may correspond to the operations of the bias memories 551_1 to 551_K (FIG. 5A), a block 650 may correspond to the operations of the operation units 531_1 to 531_K (FIG. 5A), and a block 660 may correspond to the input and output operation of data. In some embodiments, the source codes (e.g., 610 to 660) of FIG. 6 may be written based on Verilog® codes.

FIG. 7 illustrates a block diagram of a computing system according to an embodiment of the present invention.

In some embodiments, a computing system 1000 may be used as a platform for performing (or controlling) the functions or operations described with respect to the DNN conversion platform 20 (FIG. 1) and/or the DNN recognition platform 30 (FIG. 1) and/or the process depicted in FIG. 4.

In some embodiments, the computing system 1000 may be implemented with a ultra-mobile personal computer (UMPC), a net-book, a personal digital assistance (PDA), a portable computer (PC), a web tablet, a wireless phone, a mobile phone, a smart phone, an e-book, a portable multimedia player (PMP), a portable game console, a navigation device, a black box, a digital camera, a digital multimedia broadcasting (DMB) player, a digital audio recorder, a digital audio player, a digital picture recorder, a digital picture player, a digital video recorder, a digital video player, or the like.

Referring now to FIG. 7, the computer system 1000 may include a processor 1010, I/O devices 1020, memory 1030, a display device 1040, a network adaptor 1050 and bus 1060.

The processor 1010 may be communicatively coupled to I/O devices 1020, the memory 1030, the display device 1040, and the network adaptor 1050 through the bus 1060.

The memory 1030 of the computer system 1000 may store one or more program modules (not shown) for performing (or controlling) the functions or operations described hereinabove with respect to the DNN conversion platform 20 of FIG. 1 and/or the DNN recognition platform 30 and/or the example process described with reference to FIG. 4. For example, the program modules may include routines, programs, objects, components, logic, data structures, for performing particular tasks and/or implementing particular abstract data types. The processor 1010 of computer system 1000 may execute program instructions embodied in the program module to perform (or control) the functions or operations described hereinabove with respect to the DNN conversion platform 20 of FIG. 1 and/or the DNN recognition platform 30 and/or the method of FIG. 4. The program modules may be implemented into the integrated circuits of the processor 1010. In some embodiments, the program modules may be stored in memory 1030 and/or in a remote computer system storage media (not shown).

The computer system 1000 may also operate based on program modules embodied in a variety of computer system readable media. Such media may be any available media that is accessible by the computer system (e.g., 1000), and may include both volatile and non-volatile media, removable and non-removable media.

By way of example only, the memory 1030 can embody computer system readable media in the form of volatile memory, such as random access memory (RAM) and/or cache memory or others. The computer system 1000 may further include other removable/non-removable, volatile/non-volatile computer system storage media.

The computer system 1000 can communicate with one or more devices using the network adapter 1050. The network adapter may support wired communications based on Internet, local area network (LAN), wide area network (WAN), or the like, or wireless communications based on code division multiple access (CDMA), global system for mobile communication (GSM), wideband CDMA, CDMA-2000, time division multiple access (TDMA), long term evolution (LTE®), wireless LAN, Bluetooth®, or the like.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++ or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

While the present invention has been particularly shown and described with respect to preferred embodiments thereof, it will be understood by those skilled in the art that the foregoing and other changes in forms and details may be made without departing from the spirit and scope of the present invention. It is therefore intended that the present invention not be limited to the exact forms and details described and illustrated, but fall within the scope of the appended claims.

What is claimed is:

1. A computer-implemented method for accelerating a deep neural network (DNN) in a field-programmable gate array (FPGA), comprising:
    receiving, by a DNN conversion platform, a DNN net file of the DNN to be automatically converted into an FPGA hardware-centric Register-transfer Level (RTL) flow implementation comprising RTL code;
    automatically converting, by the DNN conversion platform, the DNN net file to one or more source files by: analyzing the DNN net file to identify a plurality of neural layers, and estimating a workload of each neural layer to determine a different level of parallelism for each layer according to resources of the FPGA, the determining a level of parallelism at a neural layer comprising: determining a channel parallelization factor (CPF) corresponding to a number of channels computed simultaneously in each neural layer and a kernel parallelization factor (KPF) corresponding to a number of kernels computed simultaneously in each neural layer;
    decomposing one or more neural layers of the plurality of neural layers to one or more operation blocks; and instantiating the one or more source files, based on the one or more operation blocks;
    generating an executable FPGA bit file based on the one or more source files; and
    downloading the executable FPGA bit file to the FPGA, wherein said DNN conversion platform is configured to:
    apply an operations data model to each neural layer of the network structure based on a received multi-dimensional input data for each layer, and reshape the received multi-dimensional data input according to parallel computing requirements of a current neural layer, said operations data model receiving data of a first dimension corresponding to a KPF of a previous neural layer and reshaping the received data according to a second dimension corresponding to a CPF of the current neural layer to fit within the current neural layer.

2. The computer-implemented method of claim 1, wherein the one or more source files comprise hardware description language source files comprising RTL code.

3. The computer-implemented method of claim 1, further comprising:
    generating one or more synaptic weights from one or more DNN training platforms, and
    wherein said receiving, by a DNN conversion platform, a DNN net file of the DNN, further comprises receiving the one or more synaptic weights of the DNN.

4. The computer-implemented method of claim 1, further comprising:
    generating one or more user application program interfaces (APIs), wherein said APIs are adapted to facilitate one or more DNN recognition tasks to be performed.

5. The computer-implemented method of claim 1, further comprising:
    generating a test bench for the one or more source files comprising RTL code to run simulations.

6. The computer-implemented method of claim 1, wherein converting the received DNN net file to the one or more source files comprising RTL code comprises:
    using a uniform data model and a uniform operation model for each of the neural layers.

7. The computer-implemented method of claim 1, wherein the plurality of neural layers comprise a convolution layer, a pooling layer, an inner product layer, and a softmax layer.

8. The computer-implemented method of claim 1, wherein the kernel parallelization factor (KPF) refers to an inter-kernel parallelism.

9. A computer-implemented method for accelerating a deep neural network (DNN) in a field-programmable gate array (FPGA), comprising:
    receiving, by a DNN conversion platform, a DNN net file of the DNN to be automatically converted into an FPGA hardware-centric Register-transfer Level (RTL) flow implementation comprising RTL code;
    analyzing the DNN net file to obtain a network structure including a plurality of neural layers and estimating a workload of each neural layer to determine a different level of parallelism for each layer according to resources of the FPGA, the determining a level of parallelism at a neural layer comprising: determining a channel parallelization factor (CPF) corresponding to a number of channels computed simultaneously in each neural layer and a kernel parallelization factor (KPF) corresponding to a number of kernels computed simultaneously in each neural layer;
    generating one or more hardware description language source files, each of which corresponds to one of the neural layers;
    generating an executable FPGA bit file using the hardware description language source files; and
    downloading the executable FPGA bit file to the FPGA, wherein said DNN conversion platform is configured to:
    apply an operations data model to each neural layer of the network structure based on a received multi-dimensional input data for each layer, and reshape the received multi-dimensional data input according to parallel computing requirements of a current neural layer, said operations data model receiving data of a first dimension corresponding to a KPF of a previous neural layer and reshaping the received data according to a second dimension corresponding to a CPF of the current neural layer to fit within the current neural layer.

10. The computer-implemented method of claim 9, wherein said generating one or more hardware description language source files comprises generating a first source file corresponding to a convolution layer of the neural layers.

11. The computer-implemented method of claim 10, wherein said generating the first source file comprises: decomposing the convolution layer to one or more operation blocks, instantiating first source codes corresponding to the one or more operation blocks, and combining the instantiated first source codes.

12. The computer-implemented method of claim 11, wherein the operation blocks comprise a control block, a vector multiplication and adder block, and a rectified linear unit (ReLu) block.

13. The computer-implemented method of claim 9, further comprising:
generating one or more synaptic weights from one or more DNN training platforms, and
wherein said receiving, by a DNN conversion platform, a DNN net file of the DNN, further comprises receiving the one or more synaptic weights of the DNN.

14. The computer-implemented method of claim 9, wherein said generating one or more hardware description language source files comprising RTL code comprises:
generating a second source file corresponding to a pooling layer of the neural layers,
wherein said generating the second source file comprises: decomposing the pooling layer to one or more operation blocks, instantiating second source codes corresponding to the one or more operation blocks, and combining the instantiated second source codes.

15. The computer-implemented method of claim 9, wherein the kernel parallelization factor (KPF) refers to an inter-kernel parallelism.

16. A system for accelerating a deep neural network (DNN) in a field-programmable gate array (FPGA), comprising:
at least one processor;
a memory communicatively coupled to the at least one processor, the memory storing processor readable program instructions that, when executed by the at least one processor, cause the at least one processor to:
receive a DNN net file to be automatically converted into an FPGA hardware-centric Register-transfer Level (RTL) flow implementation comprising RTL code;
automatically convert the DNN net file to one or more source files by: analyzing the DNN net file to identify a plurality of neural layers, and estimating a workload of each neural layer to determine a different level of parallelism for each layer according to resources of the FPGA, the determining a level of parallelism at a neural layer comprising: determining a channel parallelization factor (CPF) corresponding to a number of channels computed simultaneously in each neural layer and a kernel parallelization factor (KPF) corresponding to a number of kernels computed simultaneously in each neural layer;
decomposing one or more neural layers of the plurality of neural layers to one or more operation blocks; and instantiating the one or more source files, based on the one or more operation blocks;
generate an executable FPGA bit file using the one or more source files; and
download the executable FPGA bit file to the FPGA, wherein to convert the DNN net file, said at least one processor is further configured to:
apply an operations data model to each neural layer of the network structure based on a received multi-dimensional input data for each layer, and reshape the received multi-dimensional data input according to parallel computing requirements of a current neural layer, said operations data model receiving data of a first dimension corresponding to a KPF of a previous neural layer and reshaping the received data according to a second dimension corresponding to a CPF of the current neural layer to fit within the current neural layer.

17. The system of claim 16, wherein the one or more source files comprise hardware description language source files comprising RTL code.

18. The system of claim 16, wherein the program instructions further cause the at least one processor to: receive one or more synaptic weights generated from one or more DNN training platforms.

19. The system of claim 16, wherein the program instructions further cause the at least one processor to generate a test bench for the one or more source files comprising RTL code to run simulations.

20. The system of claim 16, wherein the kernel parallelization factor (KPF) refers to an inter-kernel parallelism.

21. A computer program product stored in a computer-readable storage medium having computer readable program instructions, the computer readable program instructions read and executed by at least one processor for performing a computer-implemented method of accelerating a deep neural network (DNN) in a field-programmable gate array (FPGA), wherein the method comprises:
receiving, by a DNN conversion platform, a DNN net file to be automatically converted into an FPGA hardware-centric Register-transfer Level (RTL) flow implementation comprising RTL code;
automatically converting the DNN net file to one or more source files by: analyzing the DNN net file to identify a plurality of neural layers, and estimating a workload of each neural layer to determine a different level of parallelism for each layer according to resources of the FPGA, the determining a level of parallelism at a neural layer comprising: determining a channel parallelization factor (CPF) corresponding to a number of channels computed simultaneously in each neural layer and a kernel parallelization factor (KPF) corresponding to a number of kernels computed simultaneously in each neural layer;
decomposing one or more neural layers of the plurality of neural layers to one or more operation blocks; and instantiating the one or more source files, based on the one or more operation blocks;
generating an executable FPGA bit file using the one or more source files; and
downloading the executable FPGA bit file to the FPGA, wherein said DNN conversion platform is configured to:
apply an operations data model to each neural layer of the network structure based on a received multi-dimensional input data for each layer, and reshape the received multi-dimensional data input according to parallel computing requirements of a current neural layer, said operations data model receiving data of a first dimension corresponding to a KPF of a previous neural layer and reshaping the received data according to a second dimension corresponding to a CPF of the current neural layer to fit within the current neural layer.

22. The computer product of claim 21, wherein the one or more source files comprise one or more hardware description language source files comprising RTL code.

23. The computer product of claim 21, wherein the method further comprises:
generating a test bench for the one or more source files comprising RTL code to run simulations.

24. The computer product of claim 21, wherein converting the received DNN net file and the weights to the one or more source files comprising RTL code comprises:
using a uniform data model and a uniform operation model for each of the neural layers.

25. The computer product of claim 21, wherein the method further comprises:
generating one or more synaptic weights from one or more DNN training platforms, and
wherein said receiving, by a DNN conversion platform, a DNN net file of the DNN, further comprises receiving the one or more synaptic weights of the DNN.

26. The computer product of claim 21, wherein the kernel parallelization factor (KPF) refers to an inter-kernel parallelism.

27. A computer program product stored in a computer-readable storage medium having computer readable program instructions, the computer readable program instructions read and executed by at least one processor for performing a computer-implemented method of accelerating a deep neural network (DNN) in a field-programmable gate array (FPGA), wherein the method comprises:
receiving, by a DNN conversion platform, a DNN net file of the DNN to be automatically converted into an FPGA hardware-centric Register-transfer Level (RTL) flow implementation comprising RTL code;
analyzing the DNN net file to obtain a network structure including a plurality of neural layers, and estimating a workload of each neural layer to determine a different level of parallelism for each layer according to resources of the FPGA, the determining a level of parallelism at a neural layer comprising: determining a channel parallelization factor (CPF) corresponding to a number of channels computed simultaneously in each neural layer and a kernel parallelization factor (KPF) corresponding to a number of kernels computed simultaneously in each neural layer;
generating one or more hardware description language source files, each of which corresponds to one of the neural layers;
generating an executable FPGA bit file using the hardware description language source files; and
downloading the executable FPGA bit file to the FPGA, wherein said DNN conversion platform is configured to apply an operations data model to each neural layer of the network structure based on a received multi-dimensional input data for each layer, and reshape the received multi-dimensional data input according to parallel computing requirements of a current neural layer, said operations data model receiving data of a first dimension corresponding to a KPF of a previous neural layer and reshaping the received data according to a second dimension corresponding to a CPF of the current neural layer to fit within the current neural layer.

28. The computer program product of claim 27, wherein the method further comprises:
generating one or more synaptic weights from one or more DNN training platforms, and
wherein said receiving, by a DNN conversion platform, a DNN net file of the DNN, further comprises receiving the one or more synaptic weights of the DNN.

29. The computer program product of claim 27, wherein the kernel parallelization factor (KPF) refers to an inter-kernel parallelism.

* * * * *